United States Patent
Kukreja et al.

(10) Patent No.: US 8,683,488 B2
(45) Date of Patent: *Mar. 25, 2014

(54) SYSTEM AND METHOD FOR AUTOMATICALLY GENERATING COMPUTER CODE FOR MESSAGE FLOWS

(75) Inventors: Girish G. Kukreja, Pembrook Pines, FL (US); Yogita Talathi, Magarpatta (IN)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/618,418

(22) Filed: Sep. 14, 2012

(65) Prior Publication Data

US 2013/0014127 A1 Jan. 10, 2013

Related U.S. Application Data

(63) Continuation of application No. 11/862,463, filed on Sep. 27, 2007, now Pat. No. 8,286,189.

(51) Int. Cl.
*G06F 9/54* (2006.01)
*G06F 13/00* (2006.01)

(52) U.S. Cl.
USPC ............ 719/313; 719/314; 717/100; 717/106

(58) Field of Classification Search
None
See application file for complete search history.

(56) References Cited

PUBLICATIONS

Davies et al., "WebSphere Message Broker Basics", Dec. 2005, IBM Technical Support Organization.
USPTO; Office Action dated Aug. 15, 2011 in U.S. Appl. No. 11/862,463.
USPTO; Final Office Action dated Jan. 18, 2012 in U.S. Appl. No. 11/862,463.
USPTO; Advisory Action dated Mar. 22, 2012 in U.S. Appl. No. 11/862,463.
USPTO; Notice of Allowance dated Jun. 11, 2012 in U.S. Appl. No. 11/862,463.

*Primary Examiner* — Qing Wu
(74) *Attorney, Agent, or Firm* — Snell & Wilmer L.L.P.

(57) ABSTRACT

Computer-executable code is automatically generated for a message flow in a message queuing infrastructure by determining a type of the message flow, inputting message flow parameters, and generating the computer-executable code based on the type of the message flow and the message flow parameters. The generation of code can also implement a design pattern, which is input based on the determined type of message flow. The computer-executable code can be, for example, Extended Structured Query Language (ESQL) code. The type of the message flow can identify, for example, a transformation requirement of the message flow. The transformation requirement can be, for example, one of (i) transformation from a first Extensible Markup Language (XML) message to a second XML message, (ii) transformation from an XML message to a Message Repository Manager (MRM) message, and (iii) transformation from a first MRM message to a second MRM message.

22 Claims, 7 Drawing Sheets

SYSTEM AND METHOD FOR AUTOMATICALLY GENERATING COMPUTER CODE FOR MESSAGE FLOWS

CROSS-REFERENCE TO RELATED APPLICATIONS

This application is a continuation of, claims priority to and the benefit of, U.S. Pat. No. 8,286,189 issued Oct. 9, 2012 (aka U.S. Ser. No. 11/862,463 filed Sep. 27, 2007) and entitled "SYSTEM AND METHOD FOR AUTOMATICALLY GENERATING COMPUTER CODE FOR MESSAGE FLOWS," which is hereby incorporated by reference.

BACKGROUND OF THE INVENTION

1. Field of the Invention

The present invention generally relates to message flows in a message queuing infrastructure, and more particularly to a system and method for automatically generating computer code for message flows.

2. Related Art

The information technology infrastructure of a large business can encompass a variety of different technologies, including different hardware platforms, programming languages, operating systems, and communication protocols. Middleware helps to form these different technologies into a coherent system by providing a common layer to bridge components across the infrastructure. Message queuing is a type of middleware technology that simplifies communication between the components, or nodes, of a system. A node is any point in the system that provides a service, requests a service, or connects nodes together.

Message queuing middleware, such as IBM WebSphere® MQ (WMQ) and IBM WebSphere® MQ Integrator (WMQI), provides integration for applications and Web services by allowing software applications to provide and request services residing on different nodes through the use of messages. Nodes send information and request services by sending messages to other nodes. Specifically, a message from a source node is placed in an input queue of a message broker. The message broker retrieves the message from the input queue, parses the message, and executes operations (e.g., transformation and routing) according to a message flow associated with the message. Once the operations of the message flow are completed for the message, the broker delivers the message to one or more output queues for retrieval by one or more destination nodes.

A message flow is a collection of nodes that provide small, reusable pieces of functionality for transmitting the message. Specifically, the nodes of a message flow define the series of operations and rules that the message broker executes for a message. Using message flows to communicate messages provides several advantages, particularly in a large enterprise infrastructure built on different technologies. For example, message flow nodes can be created to allow the broker to transform an input message in one format (e.g., Extensible Markup Language (XML)) to an output message in another format (e.g., MRM message). This ability to transform the format of a message facilitates communication between nodes that use different message formats. Message flow nodes can also be created to allow the broker to route an input message by, for example, setting destination queues and appending additional information to the message.

Generally, creating nodes for a message flow requires a human operator to write and test computer code. For example, WMQI allows users to create user-written nodes by inputting Extended Structured Query Language (ESQL) code into a node. ESQL is an extended version of Structured Query Language (SQL), which is a standard interactive and programming language for getting information from and updating a database. Although SQL is both an ANSI and an ISO standard, many database products support SQL with proprietary extensions to the standard language. Queries take the form of a command language that provides the ability to select, insert, update, find out the location of data, and so forth. SQL also includes a programming interface. Particularly, SQL includes a Microsoft Open Database Connectivity (ODBC) compatible interface, which allows custom applications to be built using a wide variety of programming tools or to query databases using existing ODBC-compliant applications.

In typical enterprise middleware infrastructure projects, the build time for each message flow node (in WMQI) can be relatively long. Thus development time for each message flow increases. In addition, maintaining consistency of the computer code written for different message flows from one project to another can be difficult. Moreover, errors in writing code for one project can be copied into code written for another project, causing the same defects to be repeated in the resulting message flows, which in turn increases development time due to re-work. Furthermore, it is often the case that the same or similar code written for one project cannot easily be used for another project due to the lack of knowledge of the existence of the already written code, which can result in duplication of effort.

Given the foregoing, what is needed is a system, method and computer program product for automatically generating computer code for message flows.

BRIEF DESCRIPTION OF THE INVENTION

The present invention meets the above-identified needs by providing a system, method and computer program product for automatically generating computer code for message flows.

An advantage of the present invention is that it speeds up development of message flows.

Another advantage of the present invention is that it improves productivity, particularly in situations with complex message flows having large numbers of fields that require mapping.

Yet another advantage of the present invention is that it reduces human errors and hence reduces defects during integration testing and user acceptance testing.

Still another advantage of the present invention is that it reduces development costs and time to market for developers of message flows and hence reduces the overall cost for integrating a business information technology infrastructure.

In one aspect of the present invention, computer-executable code is automatically generated for a message flow in a message queuing infrastructure. A type of the message flow is determined form user input. For example, a user can select from among a plurality of message flow types displayed on a graphical user interface. Message flow types can be selected, for example, for scenarios in which an XML application requests a service from a COBOL application, a COBOL application requests a service from an XML application, and an XML application requests a service from din XML application. Message flow parameters are input, for example, using a submenu of the graphical user interface. The computer-executable code for the message flow is automatically generated based on the determined type of the message flow and the input message flow parameters. For example, using the user's inputs, a computer can automatically generate ESQL script for use in the desired message flow.

In another aspect of the invention, a design pattern is input based on the determined type of message flow, and the computer-executable code generation is further based on the design pattern.

In still another aspect of the invention, the type of the message flow identifies a transformation requirement of the message flow based on the message flow parameters.

In yet another aspect of the invention, the conversion requirement is one of (i) transformation from a first Extensible Markup Language (XML) message to a second XML message, (ii) transformation from an XML message to a Message Repository Manager (MRM) message, and (iii) transformation from a first MRM message to a second MRM message.

In a further aspect of the invention, the determining the type of message flow includes determining a requestor type of the message flow and a provider type of the message flow, and the type of the message flow is determined based on the requestor type and the provider type.

In yet another aspect of the invention, the requestor type is one of an Extensible Markup Language (XML) requestor and a Common Business Oriented Language (COBOL) requestor, and the provider type is one of an XML provider and a COBOL provider.

In another aspect of the invention, a graphical user interface is displayed. The graphical user interface includes data entry fields for the input of the message flow parameters.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

I. Overview

The present invention is directed to a system, method and computer program product for automatically generating computer code for message flows. Message flows are commonly utilized by enterprise systems implementing message queuing middleware. A common architecture of such an enterprise system is the so-called hub-and-spoke architecture. Hub-and-spoke architectures consist of a centralized hub that accepts requests from multiple applications that are connected to the centralized hub as spokes. The spokes are generally connected with the central hub through lightweight connectors, which are constructed and deployed on top of existing systems and applications.

Inside the hub there are multiple nodes that perform functions such as message transformation, validation, routing, and asynchronous message delivery. Some hub-and-spoke-based systems provide process management functionality to orchestrate interapplication message exchanges, and an administration console to monitor and track the workings of the hub.

Figure 1:
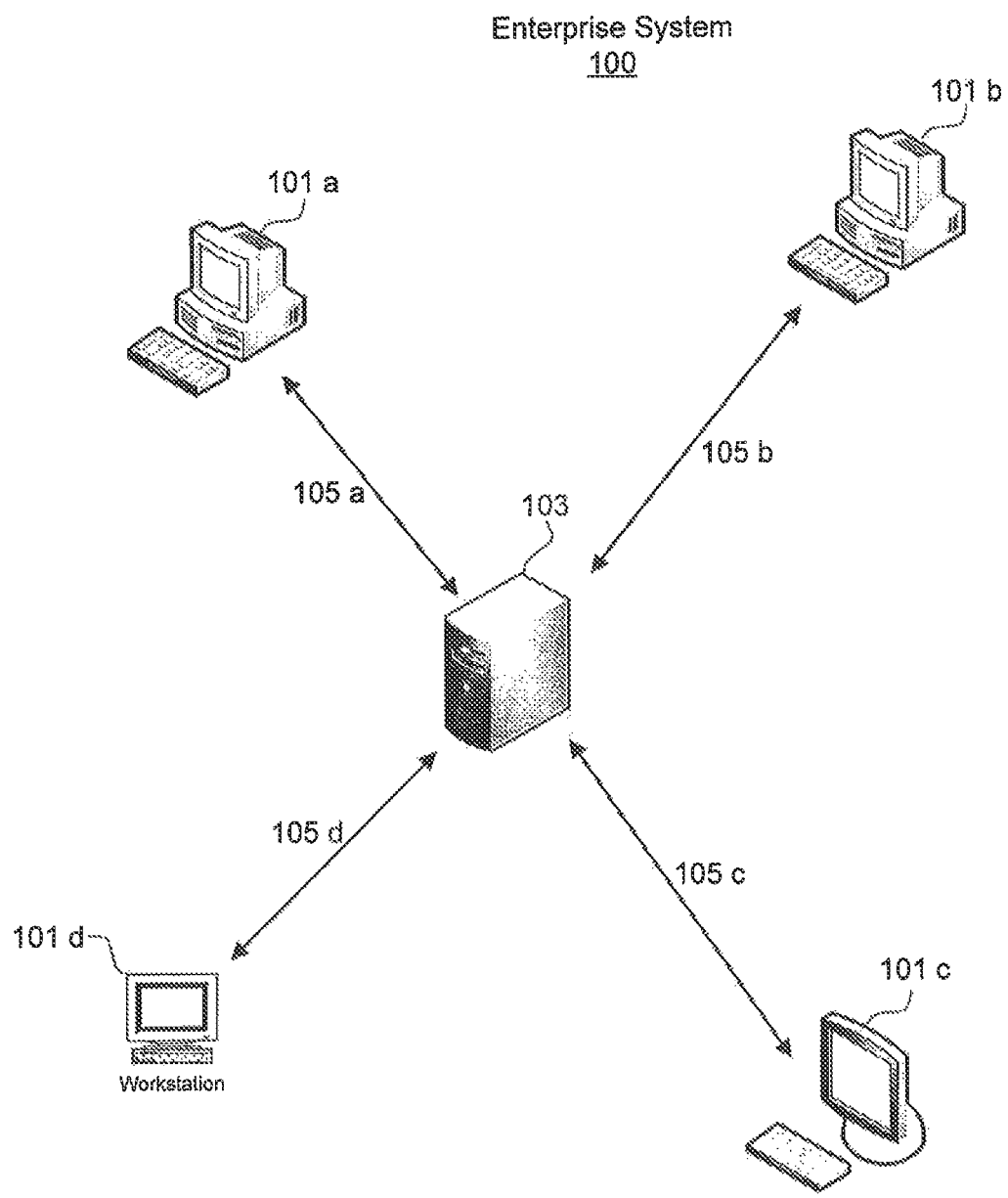
FIG. 1 is a system diagram of an exemplary enterprise system in which computer code generated according to the present invention would be implemented.

FIG. 1 is a system diagram of an exemplary enterprise system in which computer code generated by the present invention may be implemented. FIG. 1 shows a hub and spoke architecture with clients 101a, 101b, 101c and 101d at the spokes and a message broker 103 at the hub. The clients 101a, 101b, 101c and 101d are connected to message broker 103 through network connections 105a, 105b, 105c and 105d, respectively, which allows messages to be communicated between the components of enterprise system 100. Each client 101a-d has WMQ installed and the message broker 103 has both WMQ and WMQI installed. In this configuration, the message broker 103 is used for transforming messages into alternate formats and routing the messages to the various clients 101a-d in accordance with message flows.

The present invention is now described in more detail herein in terms of exemplary embodiments that generate ESQL scripts to be used in message flows implemented in the enterprise system of FIG. 1. In particular, the exemplary embodiments generate ESQL scripts for transforming and routing messages transmitted among XML applications and COBOL applications in the enterprise system. The use of exemplary embodiments of the present invention is for convenience only and is not intended to limit the application of the present invention. In fact, after reading the following description, it will be apparent to one skilled in the relevant art(s) how to implement the following invention in alternative embodiments (e.g., generating computer code to be used in message flows for performing other operations, such as filtering messages, adding data to messages, subtracting data from messages, and storing messages, the messages being transmitted among applications built on a wide variety of platforms, operating systems, communication protocols, and programming languages, implemented with different message queuing middleware such as Microsoft® Message Queuing Server, Oracle® Advanced Queuing, and Apache® ActiveMQ, which operate within different enterprise system architectures, such as queue manager clusters, message bus, etc., and for other types of requesting applications, such as BLOB messages).

The terms "user," "end user," "consumer," "customer," "operator," and/or the plural form of these terms are used interchangeably throughout herein to refer to those persons or entities capable of accessing, using, being affected by and/or benefiting from the tool that the present invention provides for automatically generating computer code for message flows.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

II. System

Figure 2:
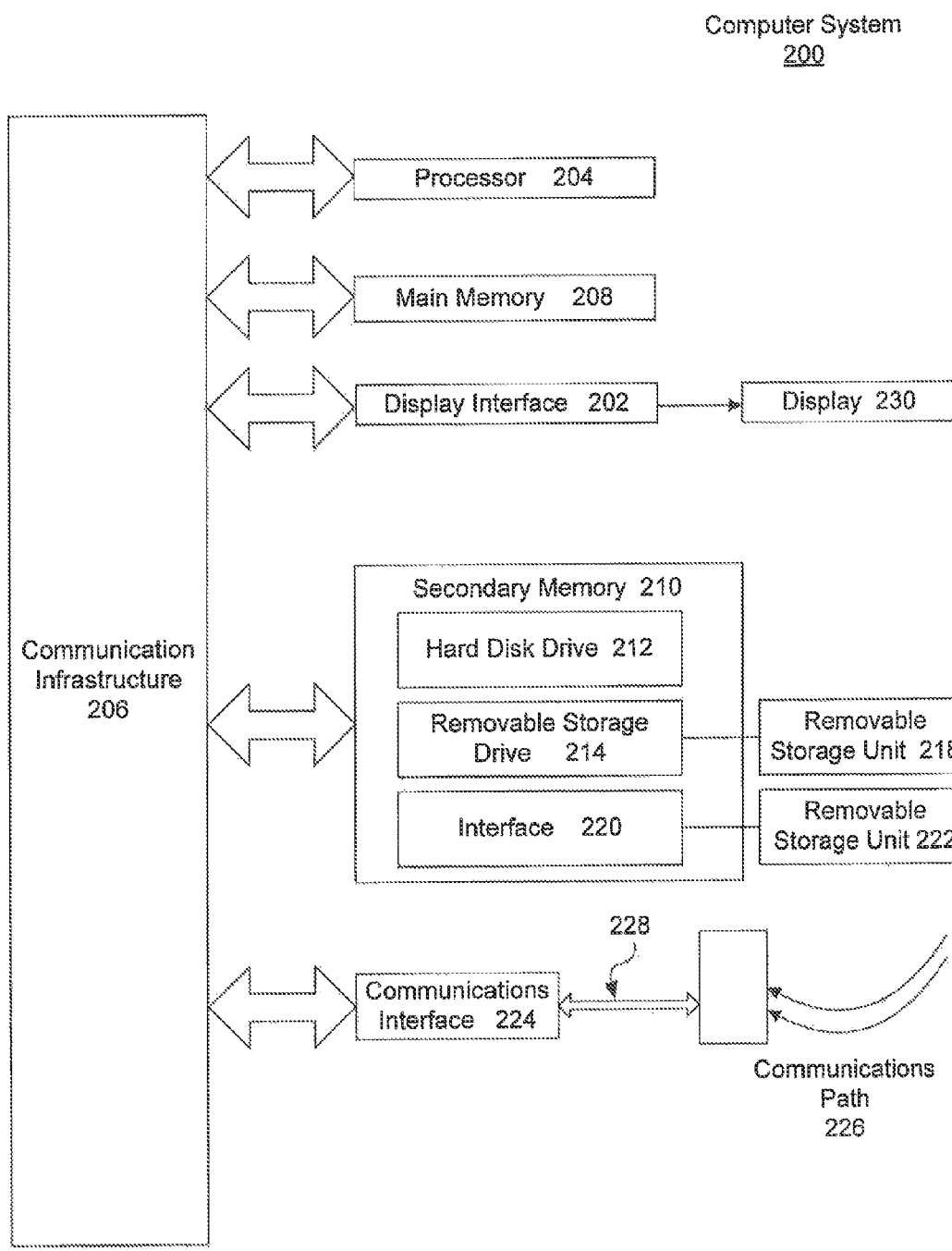
FIG. 2 is a block diagram of an exemplary computer system useful for implementing the present invention.

FIG. 2 is a system diagram of an exemplary computer system 2.00 in which the present invention, in an embodiment, would be implemented. Computer system 200 can be a client 101 in enterprise system 100, or can be a stand-alone computer system.

The computer system 200 includes one or more processors, such as processor 204. The processor 204 is connected to a communication infrastructure 206 (e.g., a communications bus, cross-over bar, or network). The processor 204 executes software code stored in one of a plurality of memories, described more fully below. Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on a display unit 230.

Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218 represents a floppy disk, magnetic tape, optical disk, etc. which is read by and written to by removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other types of removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 22.8 which may be electronic, electromagnetic, optical or other signals capable of being received by communications interface 224. These signals 228 are provided to communications interface 224 via a communications path (e.g., channel) 226. This channel 2.26 carries signals 228 and may be implemented using wire or cable, fiber optics, a telephone line, a cellular link, a radio frequency (RE) link and other communications channels.

In this document, the terms "computer program medium" and "computer usable medium" are used to generally refer to media such as removable storage drive 214, a hard disk installed in hard disk drive 212, and signals 228. These computer program products provide software to computer system 200. The invention is directed to such computer program products.

In one embodiment, computer programs (also referred to as computer control logic) are stored in main memory 208 and/or secondary memory 210. Computer programs may also be received via communications interface 224. Such computer programs, when executed, enable the computer system 200 to perform the various features of the present invention, as discussed herein. In particular, the computer programs, when executed, enable the processor 204 to perform features of the present invention. Accordingly, such computer programs represent controllers of the computer system 200.

In the present embodiment, the invention is implemented using software. The software may be stored in a computer program product and loaded into computer system 200 using removable storage drive 214, hard drive 212 or communications interface 224. The control logic (software), when executed by the processor 204, causes the processor 204 to perform the functions of the invention as described herein.

To generate computer code for message flows according to the present embodiment, a user executes the software on computer system 200. Communications interface 224 can allow the user to upload the generated computer code to the enterprise system 100 of FIG. 1, for use in message flows implemented by enterprise system 100.

III. Process

Figure 3:
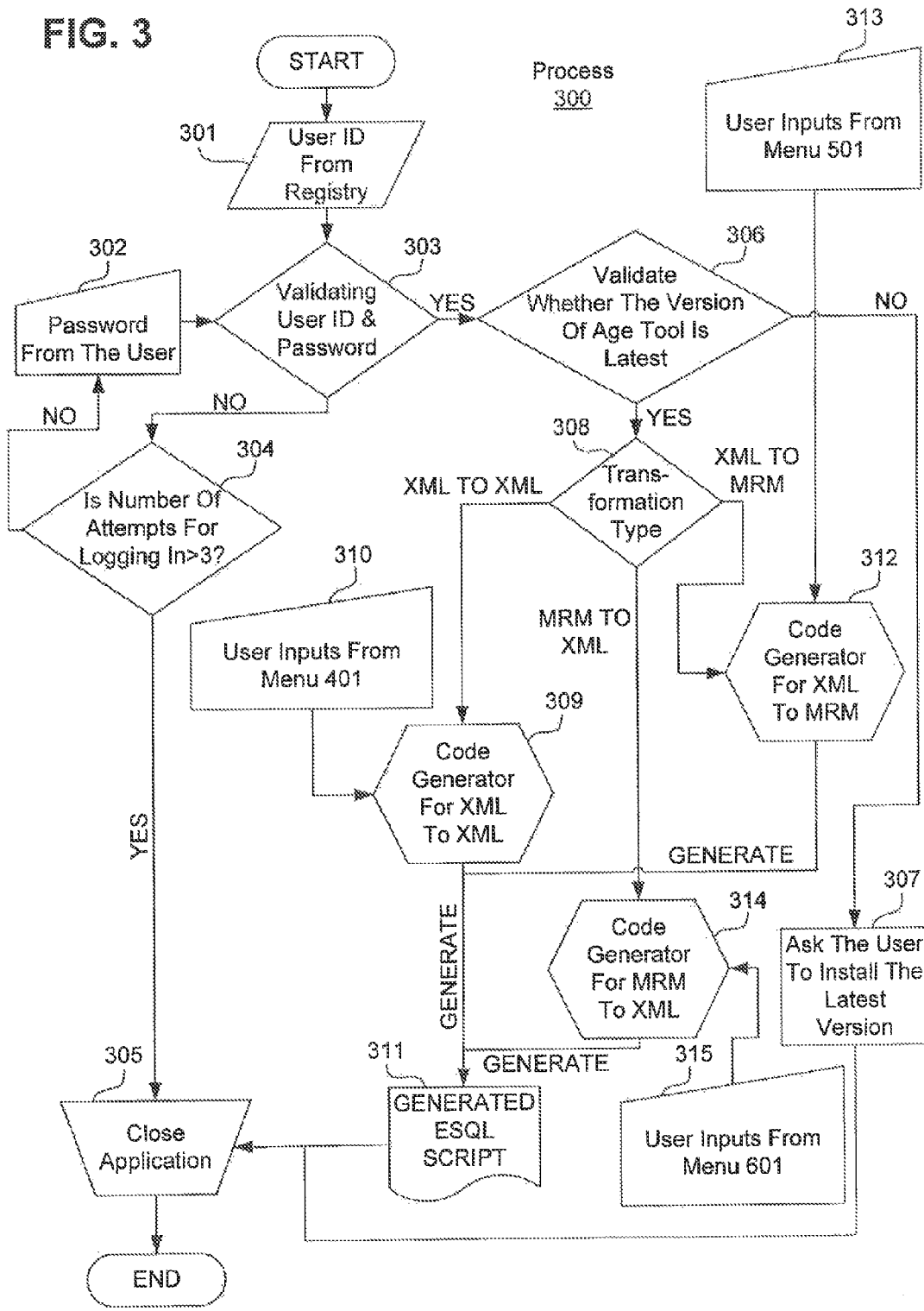
FIG. 3 is a flowchart illustrating an ESQL generating process according to one embodiment of the present invention.

FIG. 3 is a flowchart illustrating a computer code generating process 300, according to one embodiment of the present invention. Specifically, the present embodiment generates ESQL scripts for use in a message flow.

Process 300 begins when a user identifier (ID), which has previously been stored in a registry, is obtained (301) from the registry. The user is prompted (302) to enter a password corresponding to the user ID. A determination is made (303) whether the user ID and password are valid. If the user ID or password could not be validated, then a determination is made (304) as to whether too many login attempts, for example, more than three, have been made. If not, then process 300 again prompts (302) the user for a password. However, if too many login attempts have been made, the application is closed (305) and process 300 ends. If the user ID and password are validated, a determination is made (306) as to whether the latest version of the software application in accordance with the present embodiment of the invention is being used. If not, the user is prompted (307) to install the latest version of the application. If the latest version of the application is in use, a selection is made (308) of the type of format transformation required for a message.

In the present embodiment, the transformation type is selected by the user based on the type of format transformation, if any, that is required for a message from an application requesting a service to an application providing the service. A code generator is set corresponding to the selected transformation type, and message flow parameters are then input by the user. An example of how the user selects the transformation type and inputs message flow parameters will now be described in reference to FIGS. 4, 5 and 6.

Figure 4:
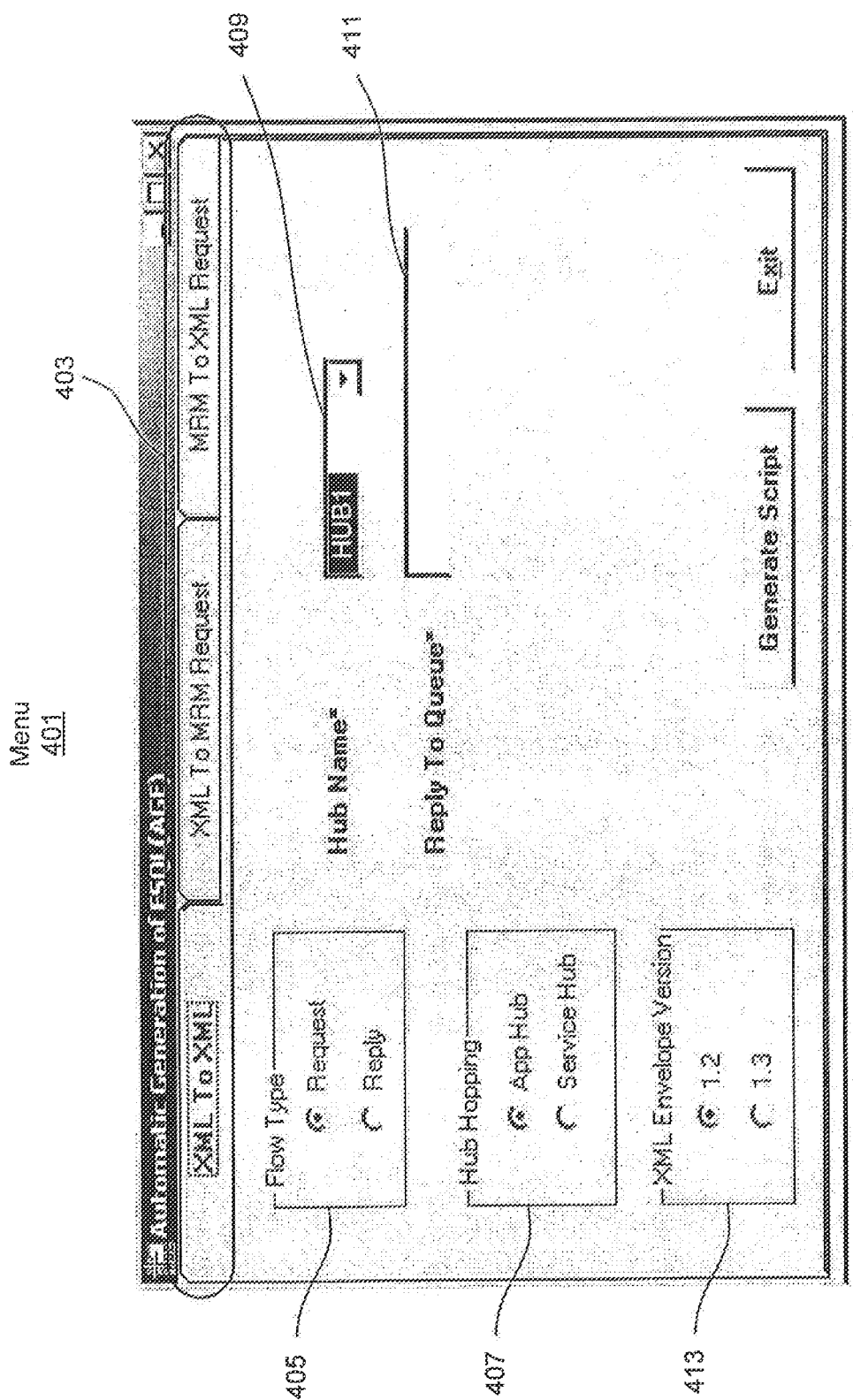
FIG. 4 is a screenshot of a graphical user interface according to one embodiment of the present invention.

FIG. 4 is a screenshot of a menu 401 of an exemplary software embodiment of the present invention displayed on display unit 230 at step 308. Menu 401 includes tabs for the selection of a transformation type 403. The transformation types of the present embodiment are "XML To XML", "MRM Request To XML", and "XML To MRM Request". For a request message from an XML application to another XML application, in which no format transformation is required, the user selects the "XML To XML" tab, and then inputs corresponding message flow parameters. Specifically, the user inputs a flow type 405 as "Request" or "Reply," hub hopping information 407 as "App Hub" or "Service Hub," a hub name 409, a reply to queue 411, and an XML envelope version 413.

Referring again to FIG. 3, after the user completes the user inputs, and selects the "Generate Script" button of menu 401, a code generator for XML to XML (309), which corresponds to the user selected "XML To XML" tab, accepts (310) the message flow parameters from menu 401, and generates ESQL script (311) for routing operations.

Figure 5:
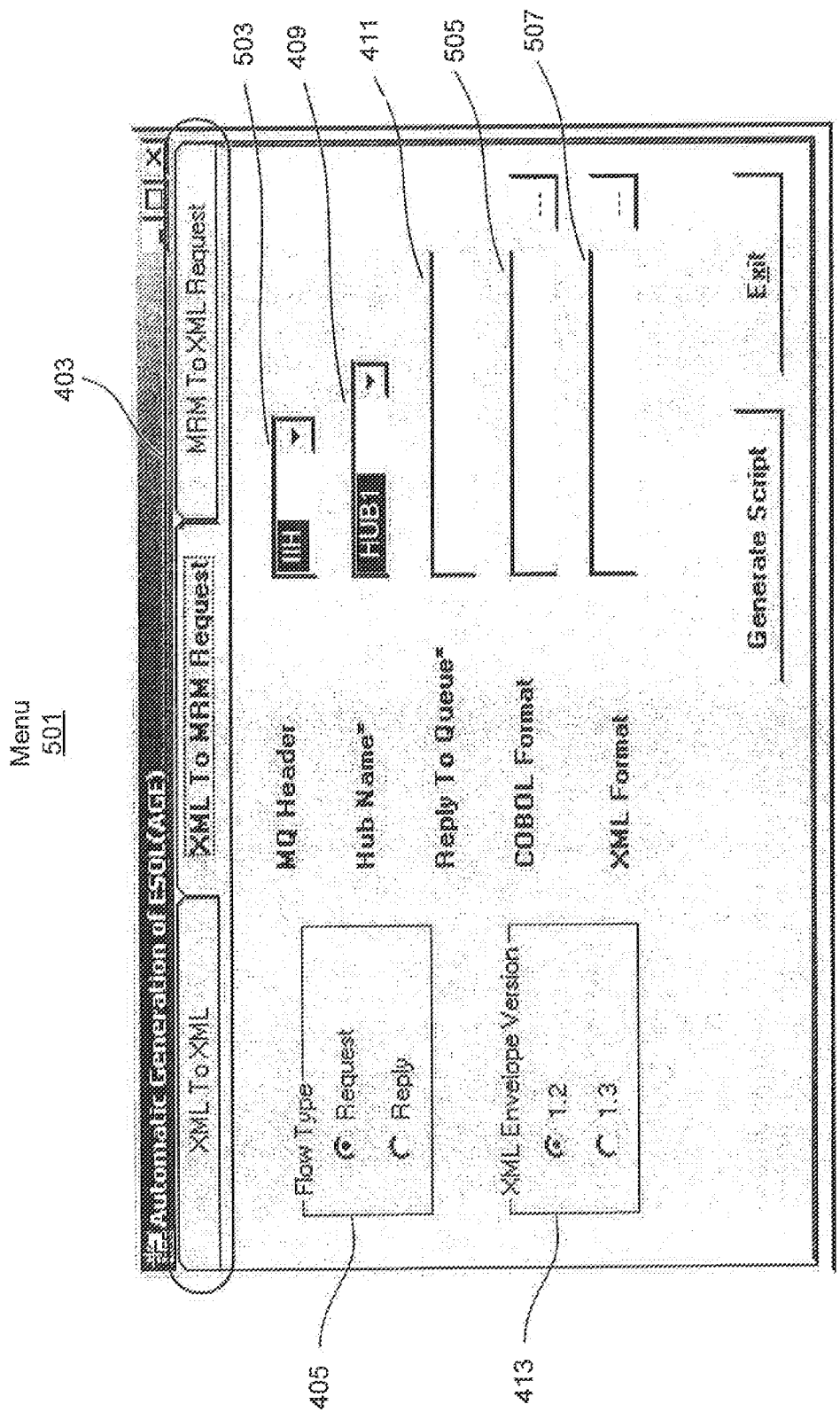
FIG. 5 is another screenshot of a graphical user interface according to one embodiment of the present invention.

In a like manner, the user can select a tab for "XML To MRM Request" of menu 401. Thus, FIG. 5 is a screenshot of a menu 501 of the exemplary software embodiment of the present invention displayed on display unit 230 at step 308. For a request message from an XML application to a COBOL application, the user sets transformation type 403 by selecting the "XML To MRM Request" tab, and then inputs corresponding message flow parameters. In the present embodiment, messages sent to and received from COBOL applications are formatted as MRM messages. Specifically, the message flow parameters the user inputs are flow type 405 as "Request" or "Reply," hub name 409, reply to queue 411, XML envelope version 413, an MQ header type 503, a COBOL format 505, and an XML format 507.

Referring again to FIG. 3, after the user completes the user inputs, and selects the "Generate Script" button of menu 501, a code generator for XML to MRM (312), which corresponds to the user selected "XML To MRM Request" tab, accepts (313) the message flow parameters from menu 501, and generates ESQL script (311) for routing operations and transformation operations.

Figure 6:
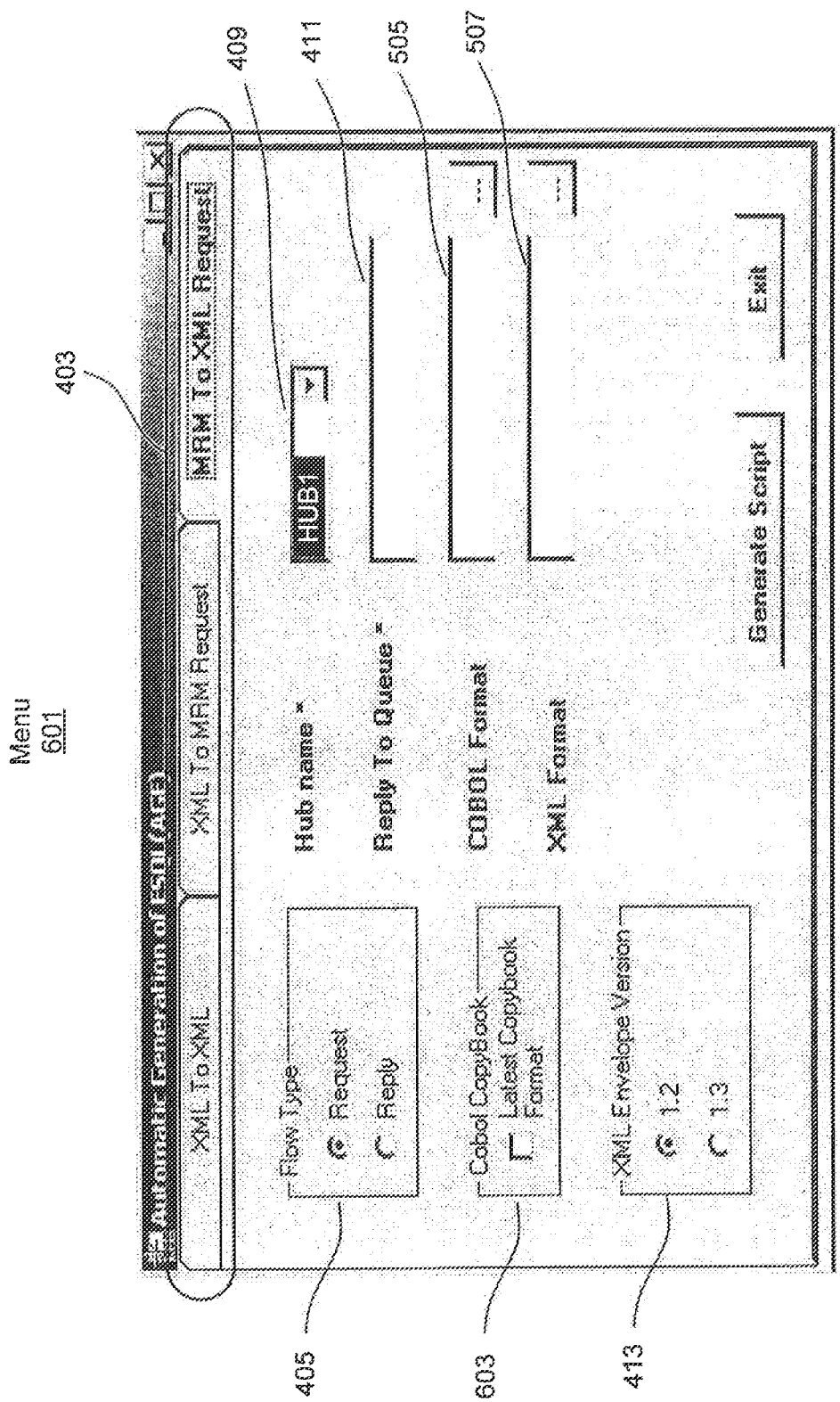
FIG. 6 is another screenshot of a graphical user interface according to one embodiment of the present invention.

In a like manner, the user can select a tab for "MRM Request To XML" of menu 401. Thus, FIG. 6 is a screenshot of a menu 601 of the exemplary software embodiment of the present invention displayed on display unit 230 at step 308. For a request message from a COBOL application to an XML application, the user sets transformation type 403 by selecting the "MRM Request To XML" tab, and then inputs corresponding message flow parameters. Specifically, the user inputs flow type 405 as "Request" or "Reply," hub name 409, reply to queue 411, XML envelope version 413, COBOL format 505, XML format 507, and a latest copybook format 603.

Referring again to FIG. 3, after the user completes the user inputs, and selects the "Generate Script" button of menu 601, a code generator for MRM to XML (314), which corresponds to the user selected "MRM Request To XML" tab, accepts (315) the message flow parameters from menu 501, and generates ESQL script (311) for routing operations.

After ESQL script has been generated, the application doses (305) and process 300 ends.

In Order to generate ESQL script for transformation and routing of a message, the code generators 309, 312, and 314 of the present embodiment implement a design pattern. While the use of a design pattern is not required, and the invention is not limited the use of a design pattern, the automatic generation of code according to a design pattern can provide many advantages. In particular, adherence to a design pattern results in more consistent WMQ and WMQI object naming and deployment, which can reduce the time and effort necessary to develop and support all messages flows. In addition, adherence to a design pattern can result in decoupling of components that request and components that provide services. In this regard, the design pattern of the present embodiment provides the code generators with (i) a standard coding practice for WMQ and WMQI objects, (ii) standard application processing requirements to be used in generating the ESQL script, and (iii) standard WMQI processing requirements to be used in generating the ESQL script.

The exemplary design pattern utilized in the present embodiment employs a logical multi-hub architecture, which is consistent with the current trend of decentralizing the processing in a WebSphere®-implemented enterprise system. In addition, all inter-hub messages are in canonical format and queues carry service names to facilitate redeployment to accommodate component and service changes. Use of the design pattern allows message flow developers and service providers to concurrently support multiple versions of each service message, which helps isolate service providers, message brokers, and requesters from the impact of new service versions. In particular, each can upgrade in an orderly fashion as business requirements dictate.

In addition, the exemplary design pattern of the present embodiment utilizes generic request and reply queues for applications and services, which can greatly reduce the number of WMQ objects to define and support, which allows new services to be employed by existing applications with minimal or no WMQ changes. Moreover, the use of generic request and reply flows for applications and services can greatly reduce the number of WMQI objects to define and support, which allows existing services to be employed by additional applications with minimal or no WMQI changes.

Figure 7:
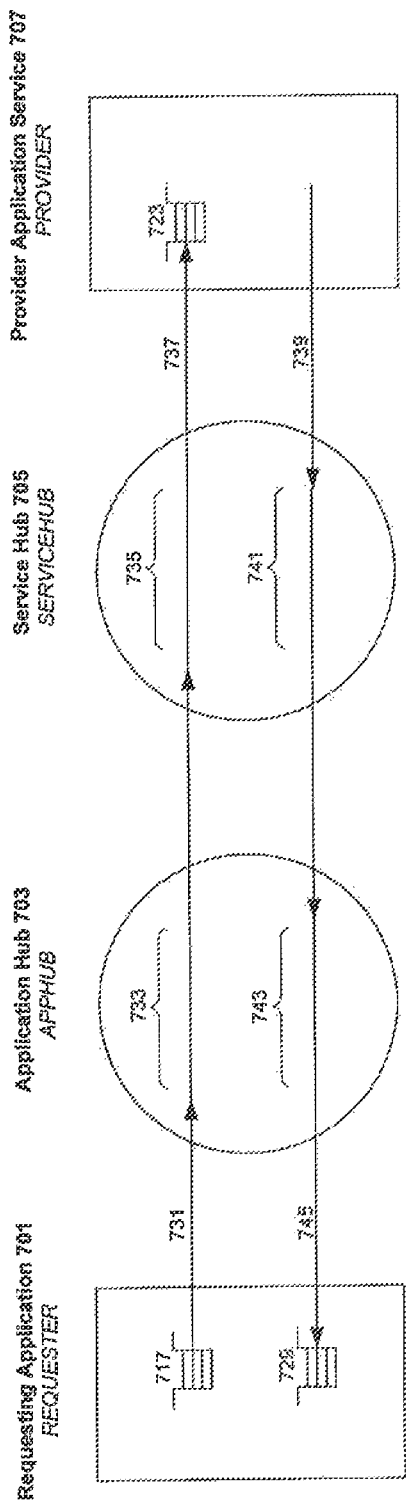
FIG. 7 is a system diagram illustrating an exemplary multi-hub architecture used by an exemplary design pattern of one embodiment of the present invention.

FIG. 7 depicts an exemplary multi-hub architecture on which the design pattern of the present embodiment is based.

FIG. 7 includes a requesting application 701 having the name "REQUESTER," an application hub 703 having the name "APPHUB," a service hub 705 having the name "SERVICEHUB," and a provider application service 707 having the name "PROVIDER," In this multi-hub architecture, a request message from requesting application 701 is routed through application hub 703 and service hub 705 to provider application service 707. A reply message from provider application service 707 is routed through service hub 705 and application hub 703 to requesting application 701.

In FIG. 7, the paths of the messages are shown by the arrowed lines. Specifically, to request a service of provider application 707, requesting application 701 places a request message in a queue 717. The request message is routed through application hub 703 and service hub 705 to reach a queue 723 of provider application service 707.

When provider application service 707 has completed processing the request message, a reply message is routed through service hub 705 and application hub 703 to reach a queue 729 of requesting application 701.

The exemplary design pattern of the present embodiment provides a standard pattern for generating ESQL script for each portion of a request message flow, which includes a service request 731 from a requester, a request flow 733 on an application hub, a request flow 735 on a service hub, and a service request 737 to a provider. The exemplary design pattern of the present embodiment also provides a standard pattern for generating ESQL script for each portion of a reply flow, which includes a service reply 739 from a provider, a reply flow 741 on a service hub, a reply flow 743 on an application hub, and a service reply 745 to a requester. The message flows can include subflows, which define additional operations to be performed on a message. For example, subflows can be used for message format transformation. In addition, the message flows can include operations to set the destination of a message In the present embodiment, requesting application 701 can be an XML application or a COBOL application. Likewise, provider application service 707 can be an XML application or a COBOL application. The particular combination of type of requesting application 701 and type of provider service application 707 is used to determine which code generator 309, 312, or 314 will be used to generate ESQL script for a message flow. In this regard, the operation of the code generators 309, 312, and 314, and the implementation of the exemplary design pattern, will now be described with respect to particular combinations of types of requesters and providers.

XML Requester-XML Provider:

If both requesting application 701 and provider application service 707 are XML applications, XML to XML code generator 309 is used to generate ESQL script. Code generator 309 utilizes two XML to XML design patterns to generate ESQL script, a request message flow design pattern and a reply message flow design pattern.

When the flow type 405 selected by the user is "Request," the XML to XML design pattern according to a request message flow is implemented by code generator 309 to generate ESQL script for request flow 733 on the application hub and request flow 735 on the service hub. The generated ESQL script for request flow 733 includes code defining a request queue, reverse routing information of the request message, compute and output nodes, a destination mode, a destination queue name, a reply to queue and a queue manager. The generated ESQL script for request flow 735 includes code defining a service request queue, reverse routing information, an application service provider input queue, and a reply to queue on service hub 705.

When the flow type 405 selected by the user is "Reply," the XML to XML design pattern according to a reply message flow is implemented by code generator 309 to generate ESQL script for reply flow 741 on the service hub and reply flow 743 on the application hub. The generated ESQL script for reply flow 741 includes code defining a service reply queue and routing replies to application hub 703. The generated ESQL script for reply flow 743 includes code routing replies to requesting application 701.

XML Requester-COBOL Provider:

If requesting application 701 is an XML application and provider application service 707 is a COBOL application, XML to MRM code generator 312 is used to generate ESQL script. Code generator 312 utilizes two XML to MRM design patterns to generate ESQL script, a request message flow design pattern and a reply message flow design pattern.

When the flow type 405 selected by the user is "Request," the XML to MRM design pattern according to a request message flow is implemented by code generator 312 to generate ESQL script for request flow 733 on the application hub and request flow 735 on the service hub. The generated ESQL script for request flow 733 includes code defining a request queue, reverse routing information, compute and output nodes, a destination mode, a destination queue, a reply to queue and queue manager. The generated ESQL script for request flow 735 includes code defining a service request queue, reverse routing information, one or more sub-flows to transform the request from XML to the corresponding version of the COBOL service request message, a reply to queue on service hub 705, and routing the request to an input queue on provider application service 707.

When the flow type 405 selected by the user is "Reply," the XML to MRM design pattern according to a reply message flow is implemented by code generator 312 to generate ESQL script for reply flow 741 on the service hub and reply flow 743 on the application hub. The generated ESQL script for reply flow 741 includes code defining a service reply queue, one or more sub-flows to transform the reply from COBOL to the corresponding version of the XML service reply message, and routing replies to application hub 703. The generated ESQL script for reply flow 743 includes code routing replies to requesting application 701.

COBOL Requester-XML Provider:

If requesting application 701 is a COBOL application and provider application service 707 is an XML application, MRM to XML code generator 314 is used to generate ESQL script. Code generator 314 utilizes two MRM to XML design patterns to generate ESQL script, a request message flow design pattern and a reply message flow design pattern.

When the flow type 405 selected by the user is "Request," the MRM to XML design pattern according to a request message flow is implemented by code generator 314 to generate ESQL script for request flow 733 on the application hub and request flow 735 on the service hub. The generated ESQL script for request flow 733 includes code defining a request queue, reverse routing information, one or more sub-flows to route requests to a corresponding service request queue on service hub 705, a reply to queue and queue manager. The generated ESQL script for request flow 735 includes code defining a service request queue, reverse routing information, and a reply to queue on service hub 705, and routing requests to an input queue on provider application service 707.

When the flow type 405 selected by the user is "Reply," the MRM to XML design pattern according to a reply message flow is implemented by code generator 314 to generate ESQL script for reply flow 741 on the service hub and reply flow 743 on the application hub. The generated ESQL script for reply flow 741 includes code defining a service reply queue, and routing replies to application hub 703. The generated ESQL script for reply flow 743 includes code defining a reply queue, one or more sub-flows to route reply messages back to the requesting application 701 and to transform the XML reply to the corresponding COBOL copybook of the service reply.

By using the above exemplary design patterns, the code generators of the present embodiment can generate consistent ESQL code for use in message flows. However, the foregoing design pattern is merely one example, and one skilled in the art would recognize that other design patterns, or none at all, could be used.

IV. Example Implementations

The present invention (i.e., computer system 200, process 300, or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant aft(s) that various changes in form and detail can be made therein without departing from the spirit and scope of the present invention. Thus, the present invention should not be limited by any of the above described exemplary embodiments, but should be defined only in accordance with the following claims and their equivalents.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A computer-implemented method comprising:
   selecting, by a computer-based system for generating computer-executable code for a message flow and based on a type of message flow, a design pattern, wherein the design pattern decouples a service-requesting component and a service-providing component; and
   generating, by the computer-based system, a computer-executable script for the message flow based on at least one of the type of the message flow, message flow parameters, and the design pattern.

2. The method of claim 1, wherein the generating the computer-executable script further comprises providing, by the computer-based system and using the design pattern, a standard coding practice, standard application processing requirements for generating the computer-executable script, and standard processing requirements for generating the computer-executable script.

3. The method of claim 1, wherein the computer-executable script comprises Extended Structured Query Language (ESQL) code.

4. The method of claim 1, wherein the type of the message flow identifies a transformation requirement of the message flow based on the message flow parameters.

5. The method of claim 4, wherein the transformation requirement is at least one of transformation from a first Extensible Markup Language (XML) message to a second XML message, transformation from an XML message to a Message Repository Manager (MRM) message, and transformation from a first MRM message to a second MRM message.

6. The method of claim 1, further comprising determining a requestor type of the message flow and a provider type of the message flow, wherein the type of the message flow is determined based on the requestor type and the provider type.

7. The method of claim 6, wherein the requestor type is at least one of an Extensible Markup Language (XML) requestor and a Common Business Oriented Language (COBOL) requestor, and the provider type is at least one of an XML provider and a COBOL provider.

8. The method of claim 1, wherein the message flow is in a message queuing infrastructure.

9. The method of claim 1, further comprising generating, by the computer-based system, code defining at least one of a request queue, an output node and a service reply queue.

10. The method of claim 1, further comprising determining, by the computer-based system, the type of the message flow and the message flow parameters.

11. The method of claim 1, further comprising executing operations, by the computer-based system, according to the message flow.

12. The method of claim 1, wherein the entire computer-executable script is generated automatically by the computer-based system.

13. The method of claim 1, further comprising displaying, by the computer-based system, a message flow type on a graphical user interface.

14. The method of claim 1, further comprising determining, by the computer-based system, that a user identifier and password are valid.

15. The method of claim 1, further comprising displaying, by the computer-based system, a Generate Script button.

16. The method of claim 1, wherein the type of message flow is determined based on user input.

17. The method of claim 1, wherein the computer-executable script is automatically generated by the computer-based system.

18. The method of claim 1, further comprising routing, by the computer-based system, a request message from a requesting application through an application hub and a service hub to a provider application service.

19. The method of claim 1, further comprising routing, by the computer-based system, a reply message from a provider application service through a service hub and an application hub to a requesting application.

20. The method of claim 1, wherein the computer-executable script is comprised of multiple nodes.

21. An article of manufacture including a non-transitory, tangible computer readable storage medium having instructions stored thereon that, in response to execution by a computer-based system for generating computer-executable code for a message flow, cause the computer-based system to perform operations comprising:
   selecting, by the computer-based system and based on a type of message flow, a design pattern, wherein the design pattern decouples a service-requesting component and a service-providing component; and generating, by the computer-based system, a computer-executable script for the message flow based on at least one of the type of the message flow, message flow parameters, and the design pattern.

22. A system comprising:
a processor for generating computer-executable code for a message flow,
a tangible, non-transitory memory configured to communicate with the processor,
the tangible, non-transitory memory having instructions stored thereon that, in response to execution by the processor, cause the processor to perform operations comprising:
selecting, by the processor and based on a type of message flow, a design pattern, wherein the design pattern decouples a service-requesting component and a service-providing component; and
generating, by the computer-based system, a computer-executable script for the message flow based on at least one of the type of the message flow, message flow parameters, and the design pattern.

* * * * *